United States Patent
Kim et al.

(10) Patent No.: US 10,783,717 B2
(45) Date of Patent: Sep. 22, 2020

(54) METHOD AND APPARATUS FOR PROCESSING THREE-DIMENSIONAL (3D) IMAGE

(71) Applicant: SAMSUNG ELECTRONICS CO., LTD., Suwon-si (KR)

(72) Inventors: Hojung Kim, Suwon-si (KR); Yongkyu Kim, Hwaseong-si (KR); Hoon Song, Yongin-si (KR); Hongseok Lee, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 571 days.

(21) Appl. No.: 15/455,400

(22) Filed: Mar. 10, 2017

(65) Prior Publication Data

US 2018/0018829 A1    Jan. 18, 2018

(30) Foreign Application Priority Data

Jul. 13, 2016  (KR) .......................... 10-2016-0088708

(51) Int. Cl.
| | |
|---|---|
| *G06T 19/20* | (2011.01) |
| *G06F 17/14* | (2006.01) |
| *H04N 13/271* | (2018.01) |
| *H04N 13/161* | (2018.01) |
| *G03H 1/08* | (2006.01) |

(Continued)

(52) U.S. Cl.
CPC .......... *G06T 19/20* (2013.01); *G03H 1/0808* (2013.01); *G06F 17/142* (2013.01); *G06T 7/262* (2017.01); *H04N 7/183* (2013.01); *H04N 13/161* (2018.05); *H04N 13/271* (2018.05); *G03H 2210/45* (2013.01); *G06T 2207/10024* (2013.01); *G06T 2207/10028* (2013.01); *G06T 2207/20056* (2013.01)

(58) Field of Classification Search
None
See application file for complete search history.

(56) References Cited

U.S. PATENT DOCUMENTS

| | | |
|---|---|---|
| 8,749,713 B2 | 6/2014 | Han |
| 9,357,200 B2 | 5/2016 | Uesaka et al. |
| 2008/0151115 A1 | 6/2008 | Agung et al. |

(Continued)

FOREIGN PATENT DOCUMENTS

| | | |
|---|---|---|
| GB | 2499146 A | 8/2013 |
| JP | 2008-131498 A | 6/2008 |

(Continued)

OTHER PUBLICATIONS

Kim, Seung-Cheol, et al. "Computer-generated holograms of a real three-dimensional object based on stereoscopic video images." Applied optics 45.22 (2006): 5669-5676. (Year: 2006).*

(Continued)

*Primary Examiner* — David Perlman
(74) *Attorney, Agent, or Firm* — Sughrue Mion, PLLC

(57) ABSTRACT

A method for processing a three-dimensional (3D) image includes acquiring a frame of a color image and a frame of a depth image, and generating a frame by combining the acquired frame of the color image with the acquired frame of the depth image. The generating of the frame includes combining a line of the color image with a corresponding line of the depth image.

11 Claims, 17 Drawing Sheets

(51) Int. Cl.
  *G06T 7/262*  (2017.01)
  *H04N 7/18*  (2006.01)

(56) References Cited

U.S. PATENT DOCUMENTS

2011/0157159 A1   6/2011  Chen et al.
2012/0206450 A1*  8/2012  Chen .................. H04N 13/139
                                                345/419
2017/0372479 A1* 12/2017  Somanath ............... G06T 7/136

FOREIGN PATENT DOCUMENTS

| KR | 10-2010-0020357 A | 2/2010 |
| KR | 10-1366116 B1 | 2/2014 |
| KR | 10-2014-0125608 A | 10/2014 |
| WO | 2012/147354 A1 | 11/2012 |

OTHER PUBLICATIONS

C.T.E.R. Hewage et al., "Comparison of Stereo Video Coding Support in MPEG-4 MAC, H.264/AVC and H.264/SVC", Feb. 10, 2014, Retrieved from the Internet on Jan. 23, 2018, 7 pages, URL: <https://www.researchgate.net/profile/Chaminda_Hewage/publication/251742364_Comparison_of_stereo_video_coding_support_in_MPEG-4_MAC_H_264AVC_and_H_264SVC/links/0deec52f8b22594849000000/Comparison-of-stereo-video-coding-support-in-MPEG-4-MAC-H-264-AVC-and-H-264-SVC.pdf>.
Communication dated Feb. 2, 2018, issued by the European Patent Office in corresponding European Patent Application No. 17180946.0.

* cited by examiner

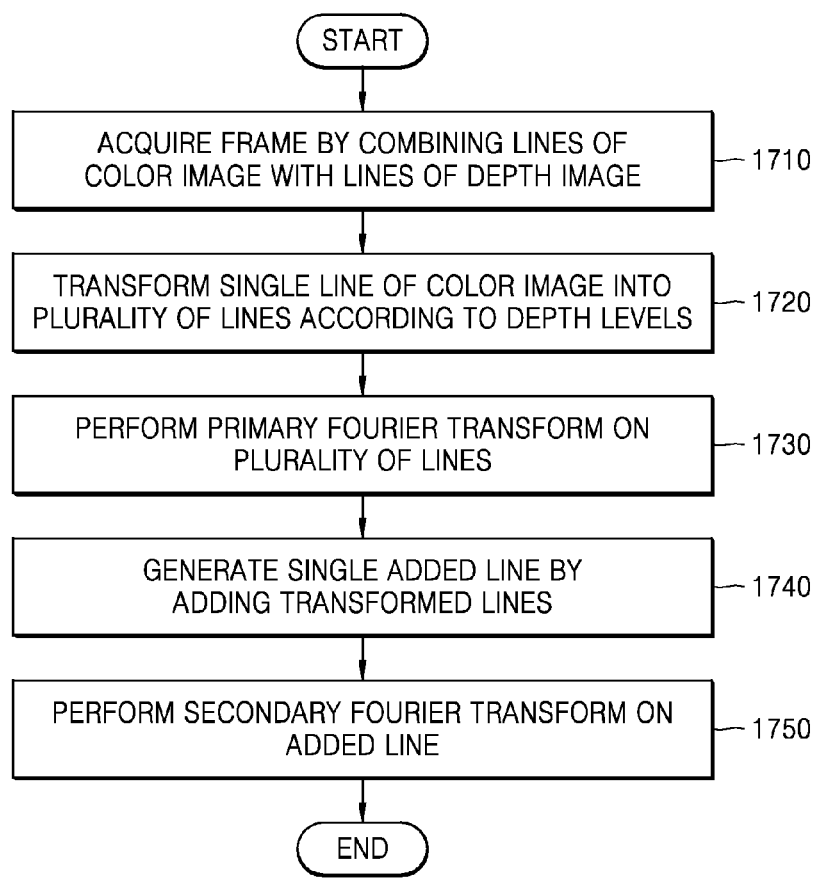

METHOD AND APPARATUS FOR PROCESSING THREE-DIMENSIONAL (3D) IMAGE

CROSS-REFERENCE TO RELATED APPLICATION

This application claims priority from Korean Patent Application No. 10-2016-0088708, filed on Jul. 13, 2016, in the Korean Intellectual Property Office, the disclosure of which is incorporated herein by reference in its entirety.

BACKGROUND

1. Field

Exemplary embodiments relate to a method of and an apparatus for processing a three-dimensional (3D) image.

2. Description of the Related Art

Research has been actively conducted with respect to three-dimensional (3D) image technology to develop apparatuses for realizing a high-definition hologram in real time by using a complex spatial light modulator (SLM) which is capable of simultaneously controlling the amplitude and the phase of light.

To reproduce a hologram moving picture, a computer-generated hologram (CGH) has been used. Image processing apparatuses perform a very large number of calculations in order to calculate a hologram value for each location on a hologram plane. In particular, to express a point in a space, image processing apparatuses need to perform a Fourier transform operation one time. To express an image of a space, image processing apparatuses need to perform as many Fourier transform operations as the number of corresponding pixels of the image.

Image processing apparatuses, such as televisions (TVs) and mobile devices, can process image data to reproduce a hologram image. In this case, the image processing apparatuses can perform a Fourier transform on the image data and reproduce an image by using transformed data.

When the image processing apparatuses perform a Fourier transform, a large number of calculations are performed, and much time is consumed. In particular, portable devices such as mobile devices have a limited size and limited available power. Thus, there is a demand for a method of reducing the number of calculations and the calculation time when image processing apparatuses perform a Fourier transform.

SUMMARY

Provided are methods of and apparatuses for processing a three-dimensional (3D) image.

Additional aspects will be set forth in part in the description which follows and, in part, will be apparent from the description, or may be learned by practice of the presented exemplary embodiments.

According to an aspect of an exemplary embodiment, a method for processing a 3D image includes acquiring a frame of a color image and a frame of a depth image; and generating a frame by combining the acquired frame of the color image with the acquired frame of the depth image, wherein the generating of the frame includes combining a line of the acquired frame of the color image with a corresponding line of the acquired frame of the depth image.

According to an aspect of another exemplary embodiment, an apparatus for processing a 3D image includes a camera configured to acquire a frame of a color image and a frame of a depth image; a memory configured to store the acquired frame of the color image and the acquired frame of the depth image; and a processor configured to generate a frame by combining the acquired frame of the color image with the acquired frame of the depth image, wherein the processor combines a line of the acquired frame of the color image with a corresponding line of the acquired frame of the depth image.

According to an aspect of another exemplary embodiment, a method of processing a 3D image includes acquiring a frame by combining a line of a color image with a line of a depth image; splitting a single line of the color image into a plurality of lines according to depth levels; performing a primary Fourier transform on the plurality of lines; generating a single added line by adding transformed lines obtained as a result of the performing the primary Fourier transform; and performing a secondary Fourier transform on the single added line.

According to an aspect of another exemplary embodiment, an apparatus for processing a 3D image includes a controller, a first core, and a second core. The controller acquires a frame by combining a line of a color image with a line of a depth image and splits a single line of the color image into a plurality of lines according to depth levels. The first core performs a primary Fourier transform on the plurality of lines. The controller generates a single added line by adding transformed lines obtained as a result of the performed primary Fourier transform, and the second core performs a secondary Fourier transform on the single added line.

BRIEF DESCRIPTION OF THE DRAWINGS

These and/or other aspects will become apparent and more readily appreciated from the following description of the exemplary embodiments, taken in conjunction with the accompanying drawings in which:

FIG. 17 is a flowchart of a 3D image processing method, according to an exemplary embodiment.

DETAILED DESCRIPTION

Exemplary embodiments now will be described more fully hereinafter with reference to the accompanying drawings.

Figure 1:
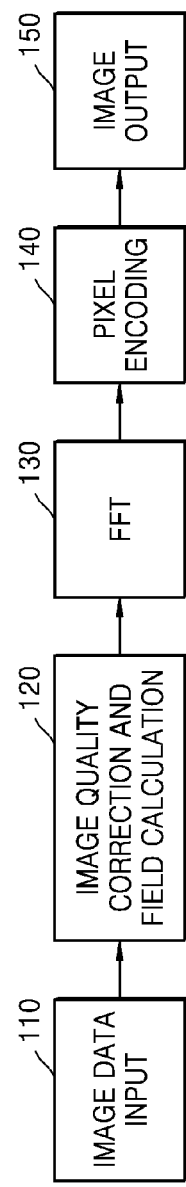
FIG. 1 is a schematic view illustrating a process of processing image data, according to an exemplary embodiment.

FIG. 1 is a schematic view illustrating a process of processing image data, according to an exemplary embodiment. Referring to FIG. 1, an image processing apparatus may receive image data and output an image upon which image processing was performed.

In operation 110, the image processing apparatus receives image data. For example, in computer-generated holography (CGH), when a layer-based algorithm is applied to image data, the image data may include color data (or a color image), depth data (or a depth image), or the like. The color data may be data that represents a plurality of colors for each plane. For example, the color data may include a red image, a blue image, and a green image. The layer-based algorithm is used to process data of each of a plurality of planes into which a reproduction area of a hologram is split based on depths. The image processing apparatus may generate a hologram image by performing a Fourier transform or an inverse Fourier transform on the data of each of the planes.

In operation 120, the image processing apparatus performs image quality correction and field calculation operations. The image processing apparatus may correct the image data in order to improve an image quality of the image data.

In operation 130, the image processing apparatus performs a Fourier transform or a fast Fourier transform (FFT). For example, the image processing apparatus may perform a Fourier transform on a two-dimensional (2D) matrix type of image data. The image processing apparatus may perform a one-dimensional (1D) Fourier transform twice in order to accomplish a 2D Fourier transform. The image processing apparatus may perform a 1D Fourier transform on the image data in a row direction and perform a 1D Fourier transform on a result of the 1D Fourier transform in a column direction. The image processing apparatus generates a hologram image as a result of the performance of the Fourier transform.

The image processing apparatus may include a plurality of cores. The plurality of cores may perform a Fourier transform on the image data in a parallel processing operation. For example, the image processing apparatus may allocate the image data of each plane to the plurality of cores, and each core of the plurality of cores may perform a respective Fourier transform on the allocated image data.

A process in which the image processing apparatus performs a Fourier transform on the image data according to exemplary embodiments will be described below in detail with reference to FIGS. 2 and 3.

In operation 140, the image processing apparatus performs a pixel encoding operation. The image processing apparatus generates data that is to be input to a screen, as a result of the pixel encoding operation.

In operation 150, the image processing apparatus outputs an image to an image display.

The image processing apparatus according to an exemplary embodiment may reduce the total number of calculations by performing a Fourier transform on only a portion of the image data in operation 140, which would otherwise require many calculations. The image processing apparatus may also reduce the amount of data that is to be stored in a memory, by storing only a portion of the image data in operation 140.

The image processing apparatus may generate a new frame by combining a color frame with a depth frame. The image processing apparatus may arrange the lines of a color frame and the line of a depth frame to alternate with each other.

The image processing apparatus may process image data and depth data in units of lines in order to reduce the number of frames stored in an external memory.

Figure 2:
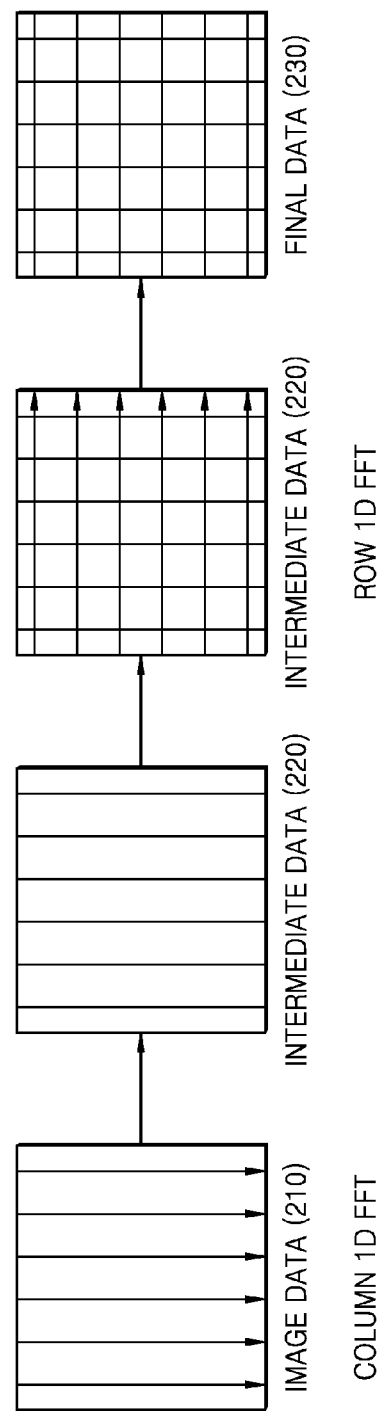
FIG. 2 illustrates a process of transforming data, according to an exemplary embodiment.

FIG. 2 illustrates a process of transforming data, according to an exemplary embodiment. Referring to FIG. 2, the image processing apparatus or a Fourier transform apparatus generates final data 230 by performing a 1D FFT twice on image data 210 (primary Fourier transform). For example, the image processing apparatus performs a 1D FFT once on the image data 210 in the column direction in order to generate intermediate data 220, and then performs a 1D FFT once on the intermediate data 220 in the row direction in order to generate the final data 230. A secondary Fourier transform may also be achieved by performing a 1D FFT twice. The order of the primary Fourier transform may be opposite to that of the secondary Fourier transform. For example, if 1D FFTs are performed in the column direction and then in the row direction when a primary Fourier transform is performed, 1D FFTs may be performed in the row direction and then in the column direction when a secondary Fourier transform is performed.

In FIG. 2, for example, a case in which the image processing apparatus performs a 1D FFT first in the column direction is illustrated. In FIG. 3, for example, a case in which the image processing apparatus performs a 1D FFT first in the row direction is illustrated.

The image processing apparatus performs a 1D FFT on the image data 210 in the column direction. The intermediate data 220 is data obtained by performing a 1D FFT on the image data 210 in the column direction. Arrows marked on the image data 210 indicate directions in which the image processing apparatus performs a 1D FFT. Straight lines marked on the intermediate data 220 indicate directions in which the image data 210 is transformed.

The image processing apparatus reads stored intermediate data 220 and performs a 1D FFT on the read intermediate data 220 in the row direction. When reading out the intermediate data 220, the image processing apparatus may read out the intermediate data 220 in the row direction and output the read-out intermediate data 220 to each 1D FFT processor.

The image processing apparatus generates the final data 230 by performing a 1D FFT on the intermediate data 220 in the row direction. The final data 230 is data obtained as the image data 210 is 1D FFT-transformed respectively in each of the column direction and the row direction.

Figure 3:
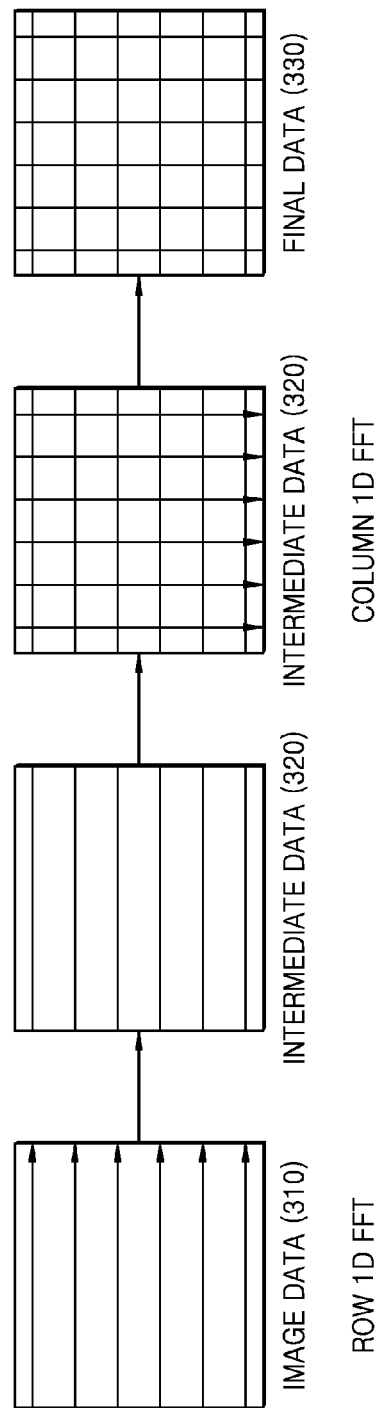
FIG. 3 illustrates a process of transforming data, according to another exemplary embodiment.

FIG. 3 illustrates a process of transforming data, according to another exemplary embodiment. Referring to FIG. 3, the image processing apparatus or a Fourier transform apparatus generates final data 330 by performing a 1D FFT twice on image data 310. For example, the image processing apparatus performs a 1D FFT once on the image data 310 in the row direction in order to generate intermediate data 320, and then performs a 1D FFT once on the intermediate data 320 in the column direction in order to generate the final data 330. In FIGS. 2 and 3, the order of a column and a row is switched and the description presented in FIG. 2 may be identically applied to the description of FIG. 3.

Figure 4:
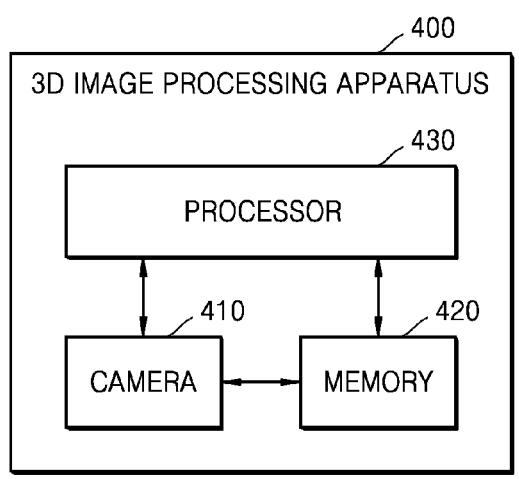
FIG. 4 is a block diagram of a three-dimensional (3D) image processing apparatus, according to an exemplary embodiment.

FIG. 4 is a block diagram of a three-dimensional (3D) image processing apparatus 400, according to an exemplary embodiment. Referring to FIG. 4, the 3D image processing apparatus 400 may include a camera 410, a processor 430, and a memory 420. The 3D image processing apparatus 400 may be an electronic apparatus (e.g., a computer, a mobile device, a display device, a wearable device, or a digital camera), a central processing unit (CPU), a graphic processing unit (GPU), or the like.

The camera 410 may be configured to capture an image and to acquire a color image and a depth image from the captured image. The color image and the depth image are acquired in units of frames. The color image includes a red image, a green image, and a blue image. Each of the red image, the green image, and the blue image is a single frame. The depth image is acquired for each color. In particular, the camera 410 acquires a depth image for the red image, a depth image for the green image, and a depth image for the blue image. The respective depth image for each of the red, green, and blue images is also a single frame.

The processor 430 generates a combined frame by combining a frame of the color image with a frame of the depth image. The combined frame may be a single frame. For example, the processor 430 may be configured to generate a first frame by combining the red image with the depth image for the red image, to generate a second frame by combining the green image with the depth image for the green image, and to generate a third frame by combining the blue image with the depth image for the blue image.

The processor 430 arranges the lines of the color image and the lines of the depth image by combining the lines of the color image with corresponding lines of the depth image. In particular, the processor 430 may combine a line of the color image with a line of the depth image and arrange a result of the combination on a new frame. Combining the lines of the color image with the lines of the depth image may be accomplished by arranging the lines of the color image and the lines of the depth image to be adjacent to each other.

For example, the processor 430 may generate a frame by arranging a line of the depth image on a next row to the row on which a line of the color image that corresponds to the depth image is arranged. When the color image includes a total of 1,080 lines and the depth image includes a total of 1,080 lines, the generated frame includes 1,080×2=2,160 lines. If a left-eye image, a right-eye image, a depth image that corresponds to the left-eye image, and a depth image that corresponds to the right-eye image are combined to generate a single frame, the generated frame includes 1,080× 4=4,320 lines.

For example, the processor 430 may generate a frame by arranging a line of the depth image and a line of the color image that corresponds to the depth image on the same row. When the color image includes a total of 1,080 lines and the depth image includes a total of 1080 lines, the generated frame includes 1,080 lines. However, each line of the generated frame is twice as long as each line of the color image.

The memory 420 stores the color image and the depth image. The memory 420 stores the frame generated by the processor 430.

Figure 5:
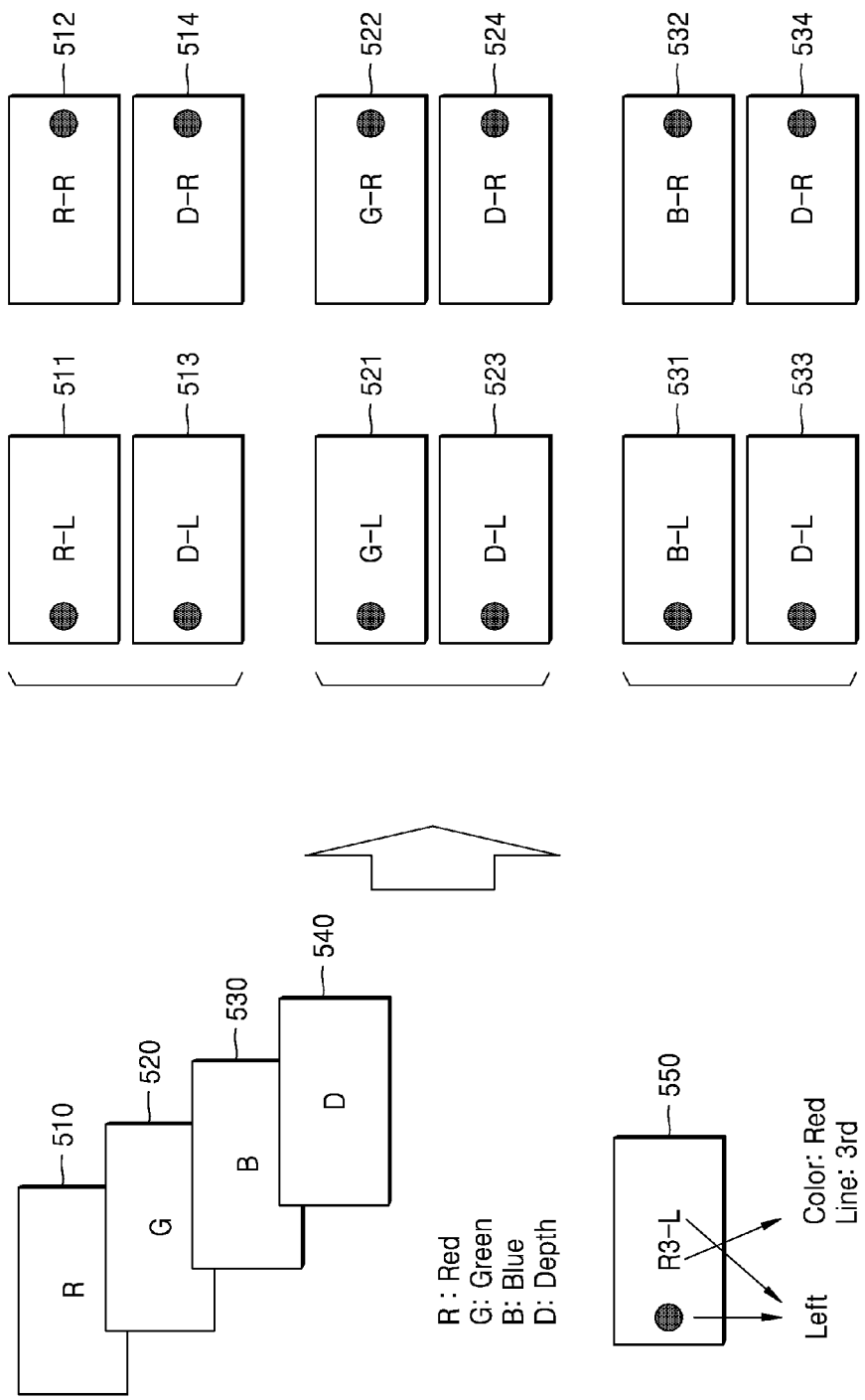
FIG. 5 is a schematic diagram for explaining frames included in a 3D image.

FIG. 5 is a schematic diagram for explaining frames included in a 3D image. The 3D image may include a red image 510, a green image 520, a blue image 530, and a depth image 540. The red image 510 includes a left-eye red image 511 and a right-eye red image 512, the green image 520 includes a left-eye green image 521 and a right-eye green image 522, and the blue image 530 includes a left-eye blue image 531 and a right-eye blue image 532. The depth image 540 includes images 513, 514, 523, 524, 533, and 534, which respectively correspond to left-eye and right-eye images of each color.

An image 550 is an example for describing characters and numerals shown on the drawings. A circle shown on the left side of the image 550 indicates that the image 550 is a left-eye image. An alphabetic character R (Red) which is foremost among the alphabetic characters shown on the image 550 indicates a red color. A numeral 3 indicates a line. Accordingly, R3 indicates a third line of a red image. A character L which is rightmost on the image 550 indicates that the image 550 is a left-eye image.

Referring to FIG. 5, a 3D image acquired by the camera 410 may include a total of 12 frames 511 through 514, 521 through 524, and 531 through 534.

Figure 6:
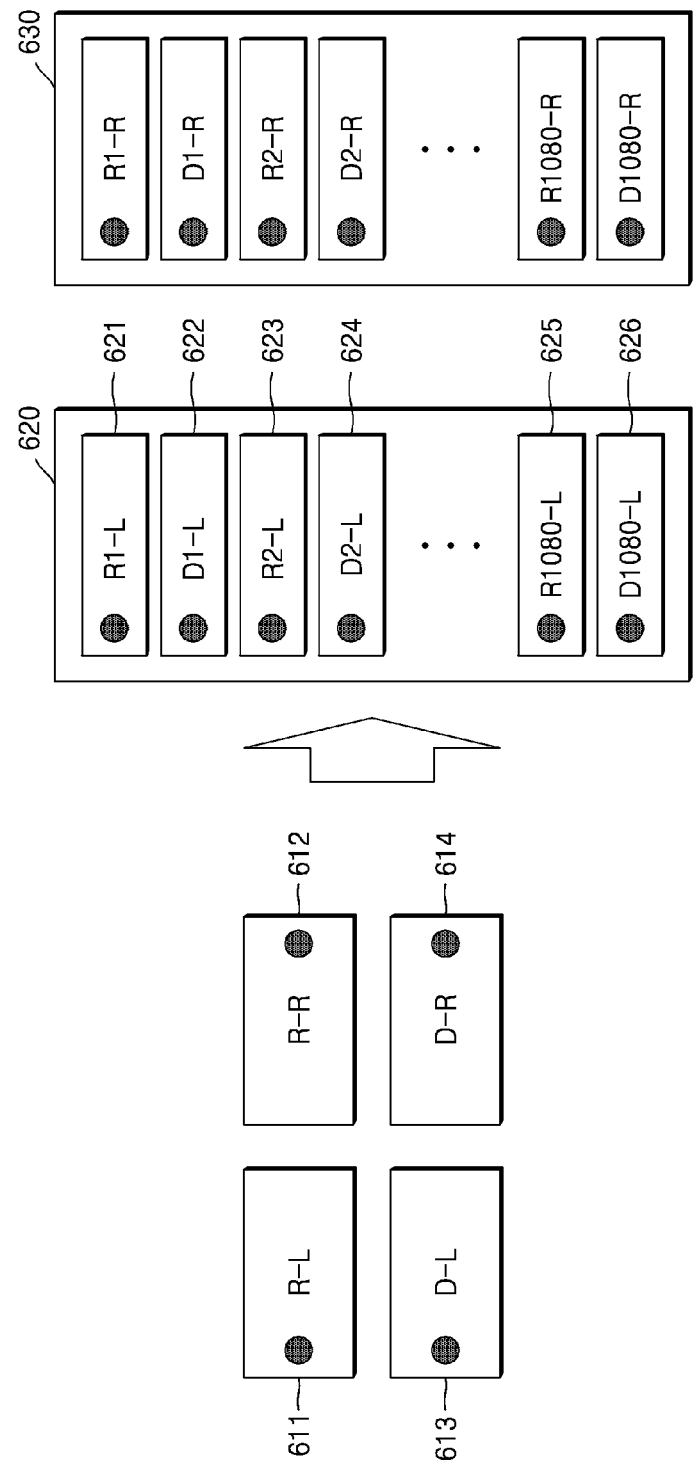
FIG. 6 is a schematic diagram for explaining a 3D image processing method, according to an exemplary embodiment.

FIG. 6 is a schematic diagram for explaining a 3D image processing method, according to an exemplary embodiment. FIG. 6 explains an image processing method for red images 611 and 612. Green images and blue images may be combined with respective depth images according to the same method as that for the red images 611 and 612. Although an image includes 1080 lines in FIGS. 6, 7, and 8, the number of lines of an image may vary.

The 3D image processing apparatus 400 may generate two frames 620 and 630 by combining four frames 611, 612, 613, and 614 with each other. The 3D image processing apparatus 400 generates the frame 620 by combining the red left-eye image 611 with a depth left-eye image 613, and generates the frame 630 by combining the red right-eye image 612 with a depth right-eye image 614.

The depth image 613 corresponds to the red image 611, and a pixel value of the depth image 613 indicates whether a red value exists or not for each depth. The depth image 614 corresponds to the red image 612, and a pixel value of the depth image 614 indicates whether a red value exists or not for each depth.

The 3D image processing apparatus 400 may generate the frames 620 and 630 by arranging a line of a depth image on a next row to the row on which a line of a color image that corresponds to the depth image is arranged. Regarding the frame 620, the 3D image processing apparatus 400 arranges a first line 621 of the red image 611 on a first line of the frame 620 and arranges a first line 622 of the depth image 613 on a second line of the frame 620. The 3D image processing apparatus 400 arranges a second line 623 of the red image 611 on a third line of the frame 620 and arranges a second line 624 of the depth image 613 on a fourth line of the frame 620. The 3D image processing apparatus 400 arranges a last line 625 of the red image 611 and a last line 626 of the depth image 613 on the two last lines of the frame 620. Accordingly, the lines of the red image 611 and the lines of the depth image 613 alternate with each other, and the frame 620 is generated in a new format that includes the red image 611 and the depth image 613. The frame 630 is generated in the same form as that of the frame 620 by combining the red image 612 with the depth image 614.

Figure 7:
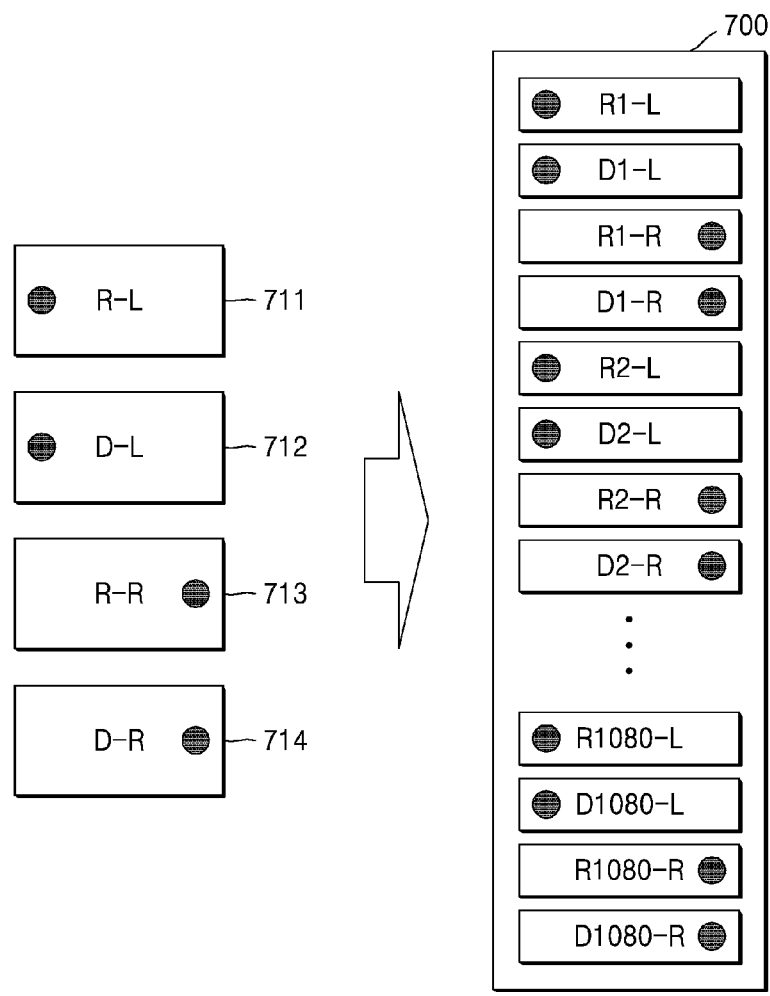
FIG. 7 is a schematic diagram for explaining a 3D image processing method, according to another exemplary embodiment.

FIG. 7 is a schematic diagram for explaining a 3D image processing method, according to another exemplary embodiment. FIG. 7 explains a method of generating a single frame 700 by combining red images 711 and 713 with depth images 712 and 714.

The 3D image processing apparatus 400 may generate the frame 700 by alternately stacking respective lines of the red image 711, the depth image 712, the red image 713, and the depth image 714 on each other. The 3D image processing apparatus 400 arranges a first line 701 of the red image 711 on a third line of the frame 700 and arranges a first line 702 of the depth image 712 on a second line of the frame 700. The 3D image processing apparatus 400 arranges a first line 703 of the red image 713 on a third line of the frame 700 and arranges a first line 704 of the depth image 714 on a fourth line of the frame 700. The 3D image processing apparatus 400 also sequentially arranges the other lines to thereby generate the frame 700. Thus, the number of lines of the frame 700 is four times the number of lines of the red image 713, and the length of a single line of the frame 700 is equal to that of a single line of the red image 713.

Although only the red images 711 and 713 are illustrated in FIG. 7, green images and blue images may also be combined with depth images in this same manner. According to the method described with reference to FIG. 7, six color images and six depth images may be combined to generate a total of three frames.

Figure 8:
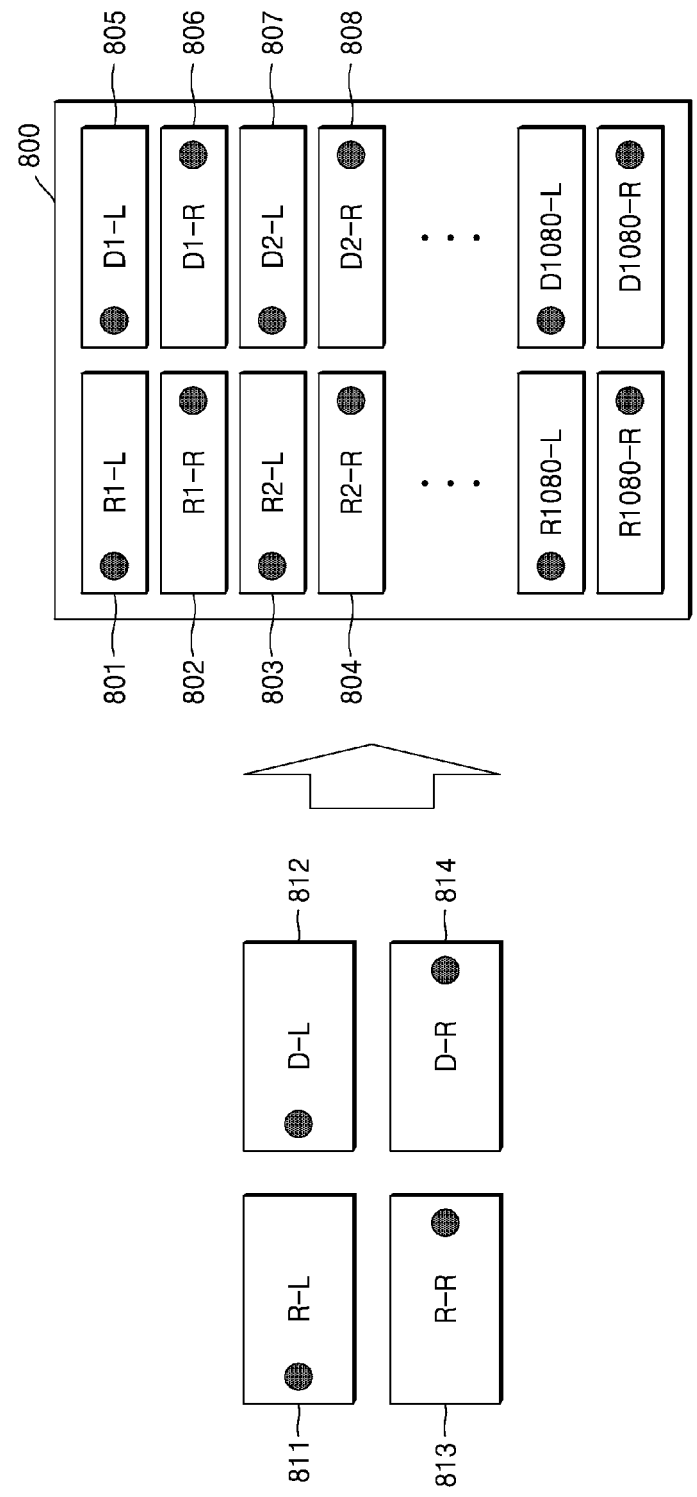
FIG. 8 is a schematic diagram for explaining a 3D image processing method, according to another exemplary embodiment.

FIG. 8 is a schematic diagram for explaining a 3D image processing method, according to another exemplary embodiment. FIG. 8 explains a method of generating a single frame 800 by combining red images 811 and 813 with depth images 812 and 814. The frame 800 includes all of the lines of the red images 811 and 813 and the depth images 812 and 814.

The 3D image processing apparatus 400 generates the frame 800 by arranging the lines of a depth image and the lines of a color image that corresponds to the depth image on the same row. The 3D image processing apparatus 400 arranges both a first line 801 of the red image 811 and a first line 805 of the depth image 812 on a first line of the frame 800. The first line 805 of the depth image 812 may be arranged on the right or left side of the first line 801 of the red image 811.

The 3D image processing apparatus 400 arranges both a first line 802 of the red image 813 and a first line 806 of the depth image 814 on a second line of the frame 800.

The 3D image processing apparatus 400 arranges both a second line 803 of the red image 811 and a second line 807 of the depth image 812 on a third line of the frame 800.

Thus, the number of lines of the frame 800 is twice the number of lines of the red image 811, and the length of a single line of the frame 800 is twice that of a single line of the red image 811.

Figure 9:
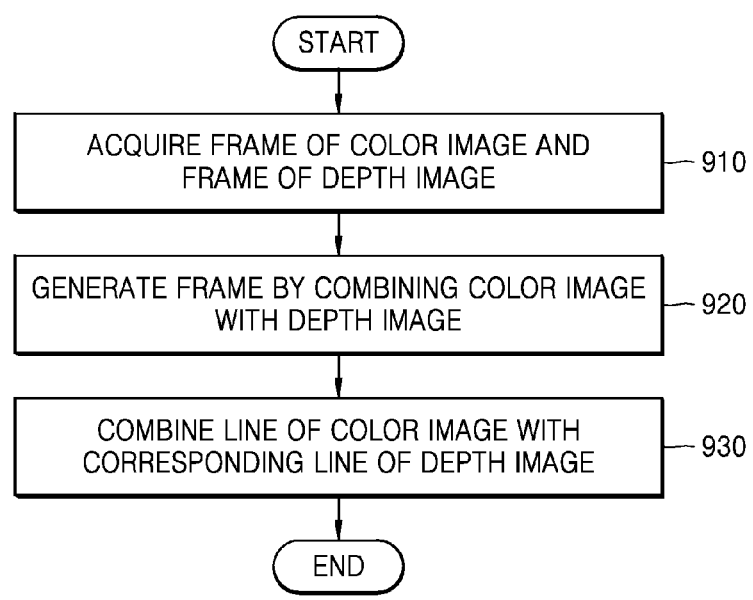
FIG. 9 is a flowchart of a 3D image processing method, according to an exemplary embodiment.

FIG. 9 is a flowchart of a 3D image processing method, according to an exemplary embodiment.

In operation 910, the 3D image processing apparatus 400 acquires a frame of a color image and a frame of a depth image. In particular, the 3D image processing apparatus 400 acquires the color image and the depth image in units of frames. The color image and/or the depth image may be captured by the camera 410. Alternatively, the color image and/or the depth image may be received from the outside of the 3D image processing apparatus 400.

In operation 920, the 3D image processing apparatus 400 generates a frame by combining the color image with the depth image. The 3D image processing apparatus 400 may alternately arrange the lines of the color image and the lines of the depth image one on another. Alternatively, the 3D image processing apparatus 400 may arrange the lines of the color image side by side with the lines of the depth image in a horizontal direction.

In operation 930, the 3D image processing apparatus 400 combines a line of the color image with a corresponding line of the depth image. The 3D image processing apparatus 400 arranges a line of the color image and a corresponding line of the depth image to be adjacent to each other.

Figure 10:
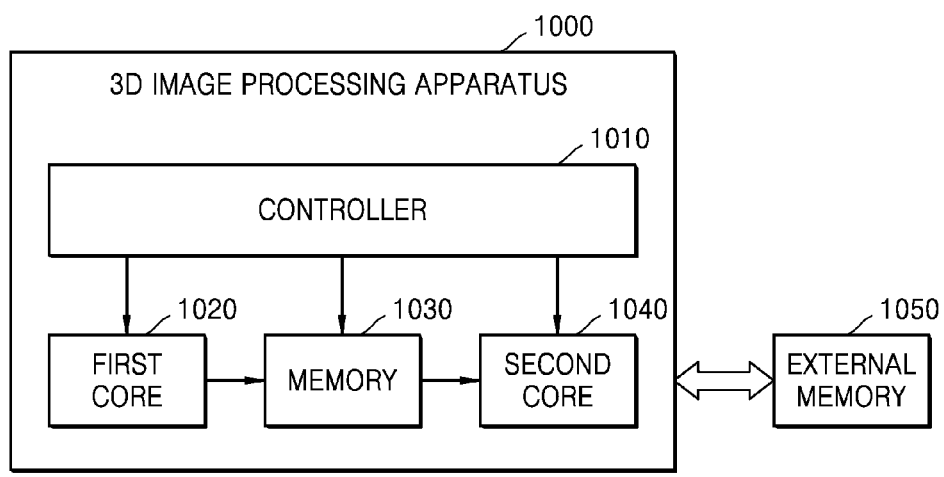
FIG. 10 is a block diagram of a 3D image processing apparatus, according to another exemplary embodiment.

FIG. 10 is a block diagram of a 3D image processing apparatus 1000, according to another exemplary embodiment. The 3D image processing apparatus 1000 may be any of a mobile device, a display device, a wearable device, a CPU, a GPU, or the like.

The 3D image processing apparatus 1000 includes a controller 1010, a first core 1020, a memory 1030, and a second core 1040. An external memory 1050 is located outside the 3D image processing apparatus 1000. The external memory 1050 may be dynamic random access memory (DRAM). Although the 3D image processing apparatus 1000 includes two cores, namely, the first and second cores 1020 and 1040, in FIG. 10, the 3D image processing apparatus 1000 may include more than two cores.

The controller 1010 controls the first core 1020, the memory 1030, and the second core 1040, for example. The controller 1010 may designate operations that are to be performed by the first and second cores 1020 and 1040. For example, the controller 1010 may control the first core 1020 to perform a 1D FFT on data in the row direction, and may also control the second core 1040 to perform a 1D FFT on data in the column direction. The controller 1010 may store intermediate data generated during a Fourier transformation operation in the memory 1030.

The first core 1020 may Fourier-transform a frame. In particular, the first core 1020 may Fourier-transform data included in each line of the frame. For example, the first core 1020 may perform a 1D FFT on the frame in the row direction in order to generate the intermediate data. The first core 1020's performing a 1D FFT on the frame in the row direction indicates performing a 1D FFT on pixel values included in the row (or line) of the frame.

The first core 1020 may output the intermediate data to the memory 1030. Every time a result value of performing a 1D FFT (i.e., the intermediate data) is generated, the first core 1020 may output the result value to the memory 1030.

The first core 1020 may include a plurality of 1D FFT processors. The 1D FFT processors may perform a 1D FFT on each line of the frame. For example, the number of 1D FFT processors included in the first core 1020 may be a divisor of the number of rows of the frame. For example, when the number of rows (lines) of the frame is 512, the first core 1020 may include eight (8), sixteen (16), thirty-two (32), or sixty-four (64) 1D FFT processors.

The memory 1030 may store and output the intermediate data. The memory 1030 may be synchronous DRAM (SDRAM).

The second core 1040 may Fourier-transform the intermediate data. The second core 1040 may include a plurality of 1D FFT processors. The 1D FFT processors may perform a 1D FFT on each column of the intermediate data. For example, the number of 1D FFT processors included in the second core 1040 may be a divisor of the number of columns of the frame. For example, when the number of columns of the frame is 1024, the second core 1040 may include eight (8), sixteen (16), thirty-two (32), or sixty-four (64) 1D FFT processors.

Figure 11:
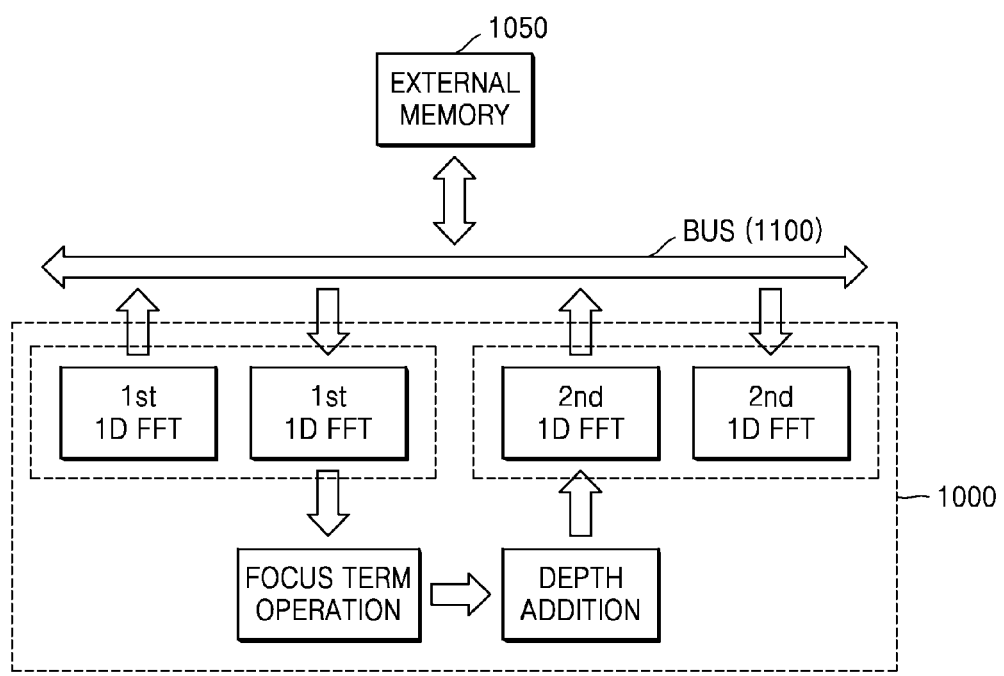
FIG. 11 is a schematic diagram for describing an operation of the 3D image processing apparatus of FIG. 10.

FIG. 11 is a schematic diagram for describing an operation of the 3D image processing apparatus 1000. The 3D image processing apparatus 1000 is connected to the external memory 1050 via a bus 1100. The 3D image processing apparatus 1000 may store a frame in the external memory 1050. Because the frame includes a large capacity of data, it may be difficult to store the frame in the 3D image processing apparatus 1000. However, since the external memory 1050 is connected to the 3D image processing apparatus 1000 via the bus 1100, it takes more time for the 3D image processing apparatus 1000 to write or read data to or from the external memory 1050 than to write or read data to or from an internal memory (not shown). In addition, when a large amount of data is transmitted via the bus 1100, a load of the bus 1100 increases and power consumption increases. Accordingly, there is a need to write data to the external memory 1050 or read data from the external memory 1050.

The 3D image processing apparatus 1000 performs a Fourier transform on the frame. The 3D image processing apparatus 1000 performs a first 2D FFT on the frame and performs a focus term operation and a depth addition on the intermediate data. After performing the depth addition, the 3D image processing apparatus 1000 performs a second 2D FFT. A 2D FFT may be performed by execution of a 1D FFT twice.

Since the 3D image processing apparatus 1000 performs a Fourier transform on the frame in units of lines, the 3D image processing apparatus 1000 does not need to store the intermediate data, which is generated during the course of performing the Fourier transformation, in the external memory 1050. For example, the 3D image processing apparatus 1000 splits a single line of a color image into a plurality of lines according to depth. The 3D image processing apparatus 1000 may perform the first 2D FFT on the plurality of lines and then may immediately add a plurality of transformed lines (i.e., depth addition). The 3D image processing apparatus 1000's splitting a single line into a plurality of lines according to depth will be described in detail below with reference to FIG. 13.

The 3D image processing apparatus 1000 performs the second 2D FFT on data that has been combined into a single line via a depth addition.

Figure 12:
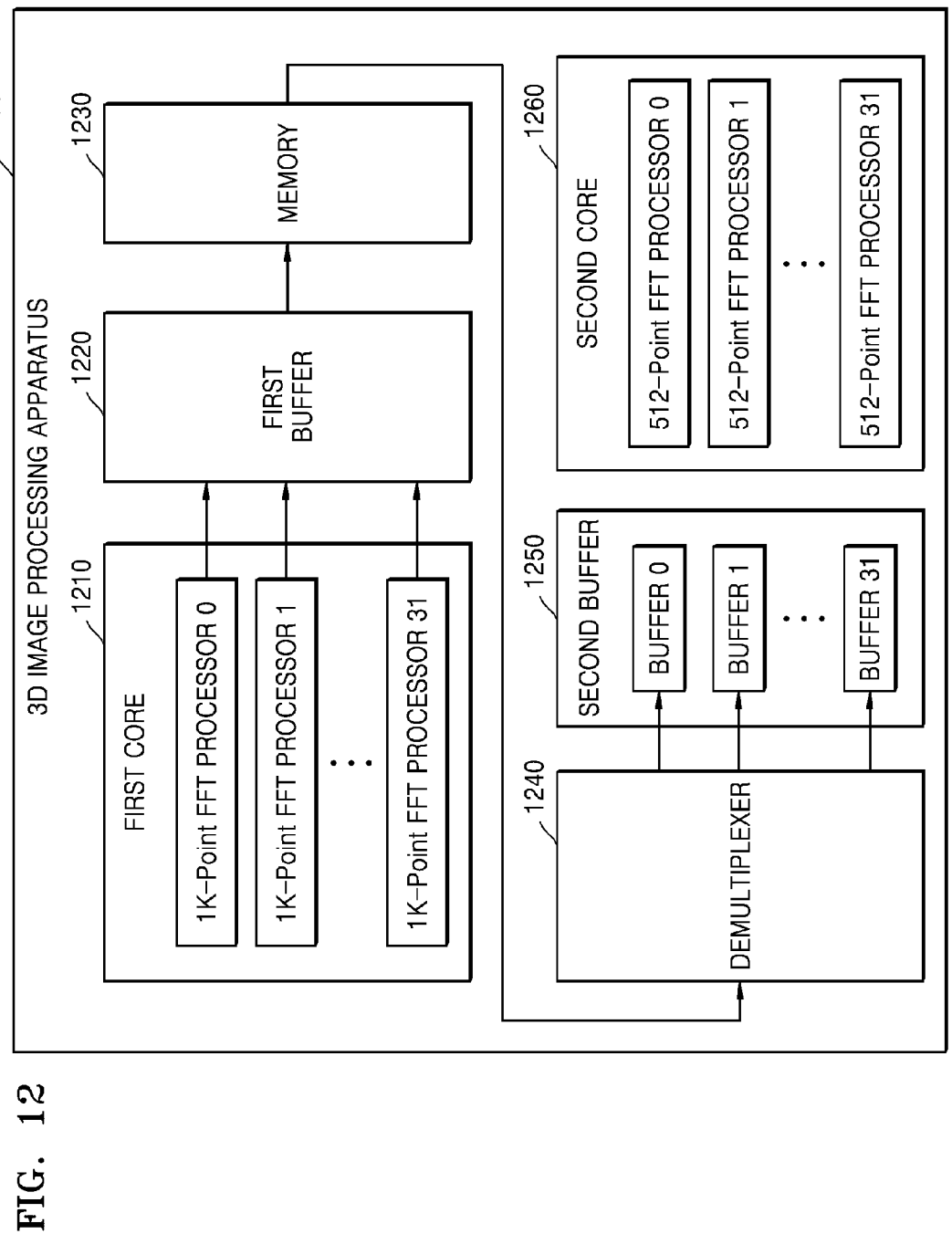
FIG. 12 is a block diagram of a 3D image processing apparatus, according to an exemplary embodiment.

FIG. 12 is a block diagram of a 3D image processing apparatus 1200, according to an exemplary embodiment. Referring to FIG. 12, the 3D image processing apparatus 1200 includes a first core 1210, a first buffer 1220, a memory 1230, a demultiplexer 1240, a second buffer 1250, and a second core 1260.

In FIG. 12, a case in which the size of a frame is, for example, 1K×512, is illustrated. In particular, in the case in which the size of a frame is, for example, 1K×512, a single line of the frame is 1K, and the frame includes 512 lines. Accordingly, 1D FFT processors included in the first core 1210 are 1K-Point FFT processors, and 1D FFT processors included in the second core 1260 are 512-Point FFT processors. Each 1K-Point FFT processor may perform the Fourier transform with respect to one thousand twenty-four (1024) pixel values, and each 512-Point FFT processor may perform the Fourier transform with respect to five hundred and twelve (512) pixel values. The number of processors included in the first core 1210 and the second core 1260 may vary according to an input image.

The first core 1210 includes a plurality of 1K-Point FFT processors. The 1K-Point FFT processors perform a 1D FFT on the frame. The term "1K-Point" denotes that a processor performs a 1D FFT on one thousand twenty-four (1024) pixel values of the frame. For example, the first core 1210 may include thirty-two (32) 1K-Point FFT processors. A 1K-Point FFT processor 0 denotes a 0th (i.e., zeroth) processor, a 1K-Point FFT processor 1 denotes a 1st processor, and a 1K-Point FFT processor 31 denotes a 31st processor. The 1K-Point FFT processor 0 may transform a 1st line (or 1st row) of the frame, the 1K-Point FFT processor 1 may transform a 2nd line of the frame, and the 1K-Point FFT processor 31 may transform a $32^{nd}$ line of the frame. The 1K-Point FFT processor 0 to the 1K-Point FFT processor 31 may simultaneously perform Fourier transforms with respect to the respective lines and output intermediate values. Each intermediate value indicates a pixel value generated by performing a Fourier transform on the frame, and represents a part of the intermediate data.

The first buffer 1220 sequentially stores the intermediate values output from the first core 1210. The first buffer 1220 stores the intermediate values output from the 1K-Point FFT processor 0 to the 1K-Point FFT processor 31. For example, the first buffer 1220 may store thirty-two (32) intermediate values sequentially output from the 1K-Point FFT processor 0 to the 1K-Point FFT processor 31, and output thirty-two (32) intermediate values to the memory 1230. The thirty-two (32) intermediate values that are initially stored represent the pixel values of the first column of the intermediate data. Next, the first buffer 1220 may store the thirty-two (32) intermediate values that are sequentially output from the 1K-Point FFT processor 0 to the 1K-Point FFT processor 31, and the thirty-two (32) intermediate values that are secondly stored represent the pixel values of the second column of the intermediate data.

Figure 13:
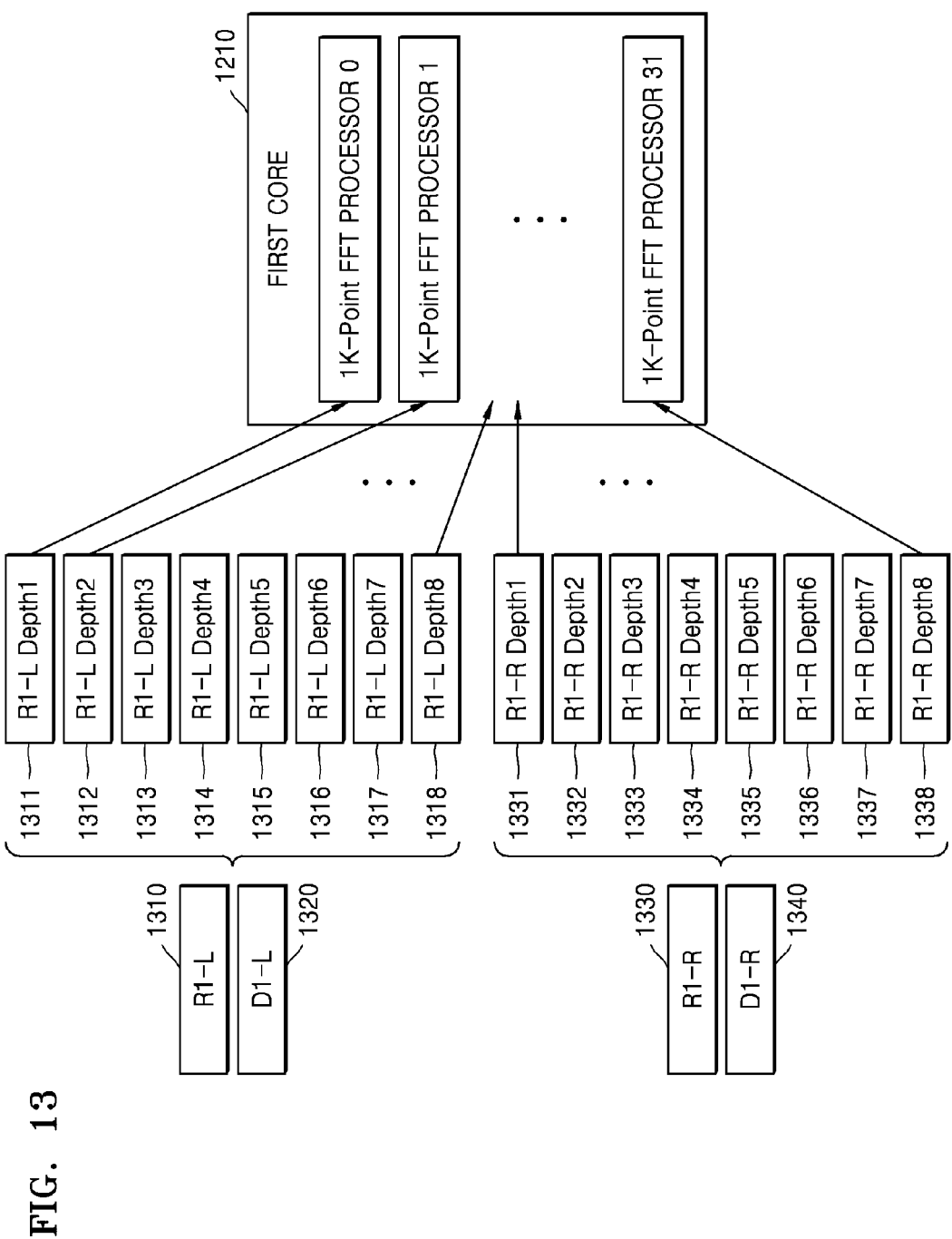
FIG. 13 is a block diagram for explaining the operation of the 3D image processing apparatus of FIG. 12 of splitting a single line into a plurality of lines according to depth.

FIG. 13 is a block diagram for explaining how the 3D image processing apparatus 1200 splits a single line into a plurality of lines according to depth. FIG. 13 illustrates a case in which a depth is divided into eight (8) levels. When a depth has N levels, a single line of a color image is split into N lines.

A line 1310 is a first line of a left-eye red image. A line 1320 is a first line of a left-eye depth image and is data representing the depth of the line 1310 of the red image. When a depth has 8 levels, each pixel value of the line 1320 of the depth image may include 8 bits. Each bit may represent whether a color exists or not for each depth. For example, a first pixel value of the line 1320 of the depth image represents the depth of a red color. When the first pixel value of the line 1320 of the depth image is 00100000, a red color exists at a level 3.

The 3D image processing apparatus 1000 generates a line 1311 of the red image at a depth 1 by applying first bits of the line 1320 of the depth image to the line 1310 of the red image, and generates a line 1312 of the red image at a depth 2 by applying second bits of the line 1320 of the depth image to the line 1310 of the red image. The 3D image processing apparatus 1000 generates lines 1313 through 1318 by respectively performing the same operation on the corresponding depth, i.e., depth 3 to depth 8.

The 3D image processing apparatus 1000 may also split a line 1330 of the right-eye red image and a line 1340 of the right-eye depth image into eight lines 1331 through 1338.

The eight lines 1311 through 1318 may be primarily-Fourier-transformed by the first core 1210 and the second core 1260. A primary Fourier transform is a Fourier transform that is performed with respect to a distance from the retina to the pupil, and a secondary Fourier transform is a Fourier transform that is performed with respect to a distance from the eye to a panel. The eight lines 1311 through 1318 are respectively input to corresponding processors of the first core 1210. The line 1311 may be input to the 1K-Point FFT processor 0, the line 1312 may be input to the 1K-Point FFT processor 1, and the line 1313 may be input to the 1K-Point FFT processor 2. The eight lines 1311 through 1318 may be simultaneously input to the 1K-Point FFT processor 0 to the 1K-Point FFT processor 31. Eight lines 1311 through 1318 obtained via the transformation of the first core 1210 may be input to the second core 1260 via the first buffer 1220, the memory 1230, the demultiplexer 1240, and the second buffer 1250. The eight lines 1311 through 1318 may be Fourier-transformed by the second core 1260 and may be output to the external memory 1050.

Figure 14:
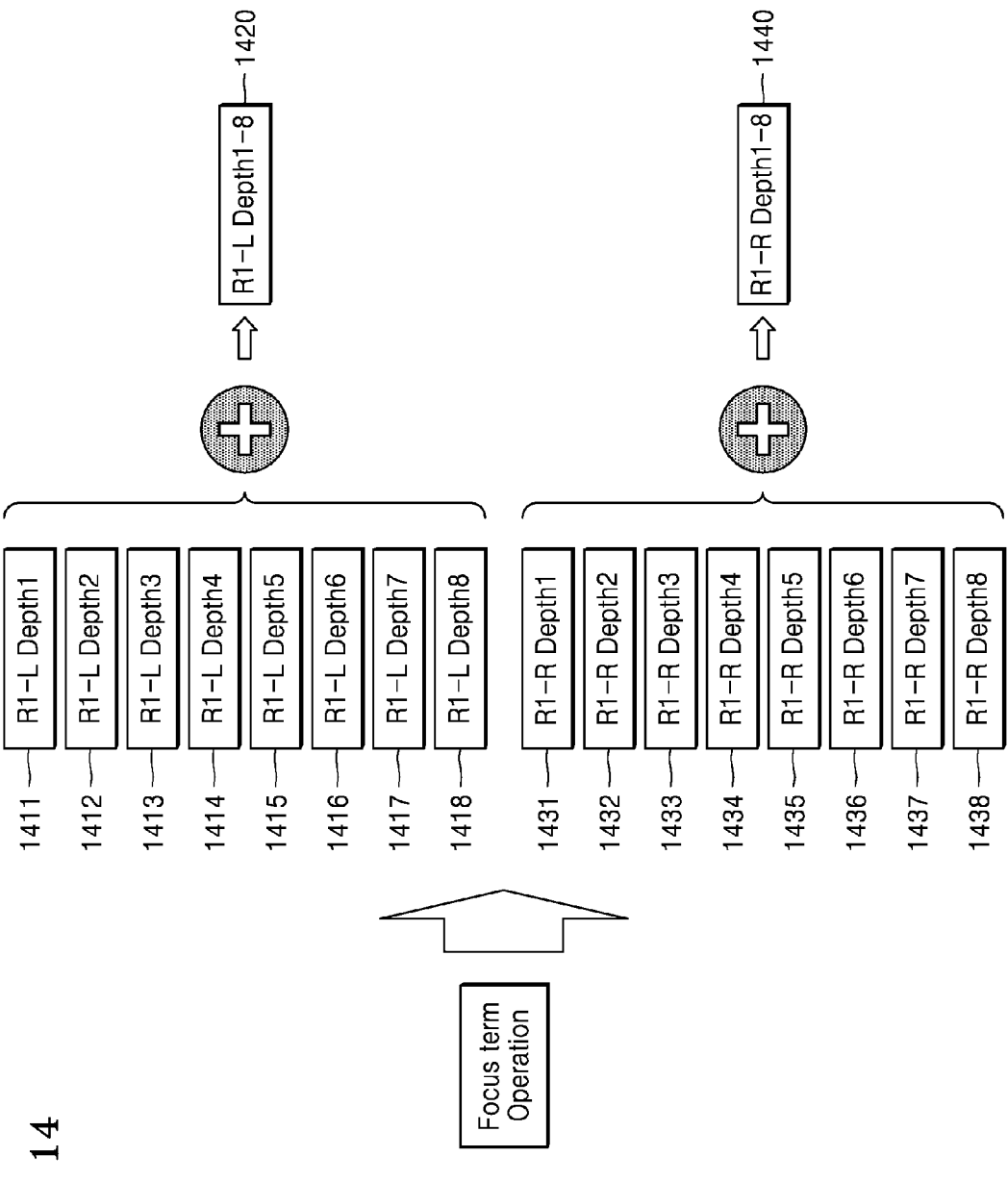
FIG. 14 is a schematic diagram for explaining a method of performing a depth addition, according to an exemplary embodiment.

FIG. 14 is a schematic diagram for explaining a method of performing a depth addition, according to an exemplary embodiment. The 3D image processing apparatus 1000 may perform a focus term operation on primary-Fourier-transformed lines and then perform a depth addition on the primary-Fourier-transformed lines. Since the 3D image processing apparatus 1000 is able to perform a depth addition on each line of an image, the 3D image processing apparatus 1000 neither needs to store nor read in a frame of a depth image from the external memory 1050 in order to perform a depth addition. The 3D image processing apparatus 1000 may perform a depth addition by adding all of lines 1411 through 1418 and may generate a line 1420 via the addition. In this aspect, the 3D image processing apparatus 1000 generates the single line 1420 by adding the eight lines 1411 through 1418 together, and generates a signal line 1440 by adding eight lines 1431 through 1438 together.

Figure 15:
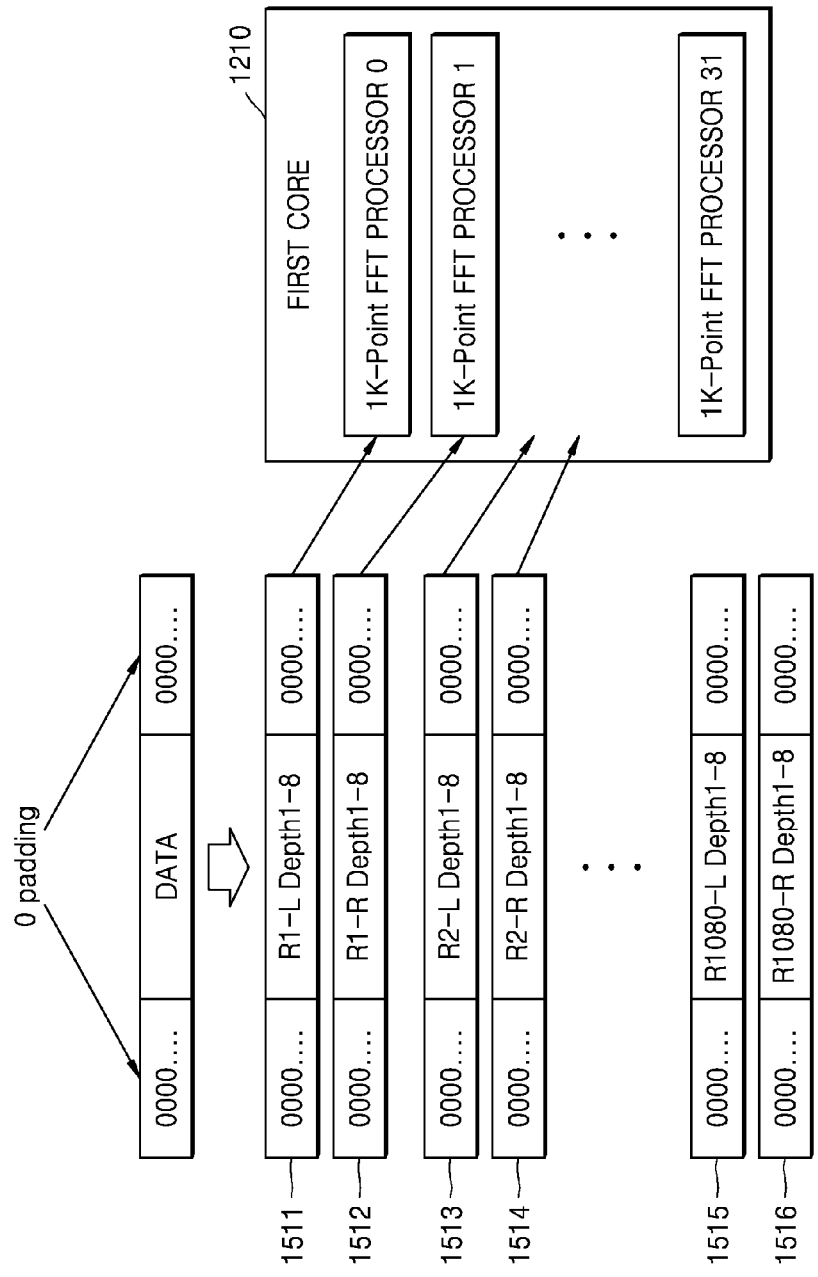
FIG. 15 is a schematic diagram for explaining a method of performing a secondary Fourier transform.

FIG. 15 is a schematic diagram for explaining a method of performing a secondary Fourier transform. The 3D image processing apparatus 1000 performs zero padding on data and then performs a secondary Fourier transform on a result of the zero padding operation. Data obtained via the secondary Fourier transform is data that has undergone a primary Fourier transform, a focus term operation, and a depth addition.

The 3D image processing apparatus 1000 may perform a depth addition on a line and then may perform a secondary Fourier transform on a depth-added line. The secondary Fourier transform may be performed by the first core 1210 and the second core 1260.

Lines 1511 through 1516 have a zero padding-performed structure. For example, the depth-added line 1420 in FIG. 14 turns into the line 1511 via zero padding. In detail, the 3D image processing apparatus 1000 generates the line 1511 by adding a plurality of 0s (zeros) to the left and right sides of the line 1420, and generates the line 1512 by adding a plurality of 0s (zeros) to the left and right sides of the line 1440. Each generated line is input to the first core 1210 and undergoes a secondary Fourier transform.

Figure 16:
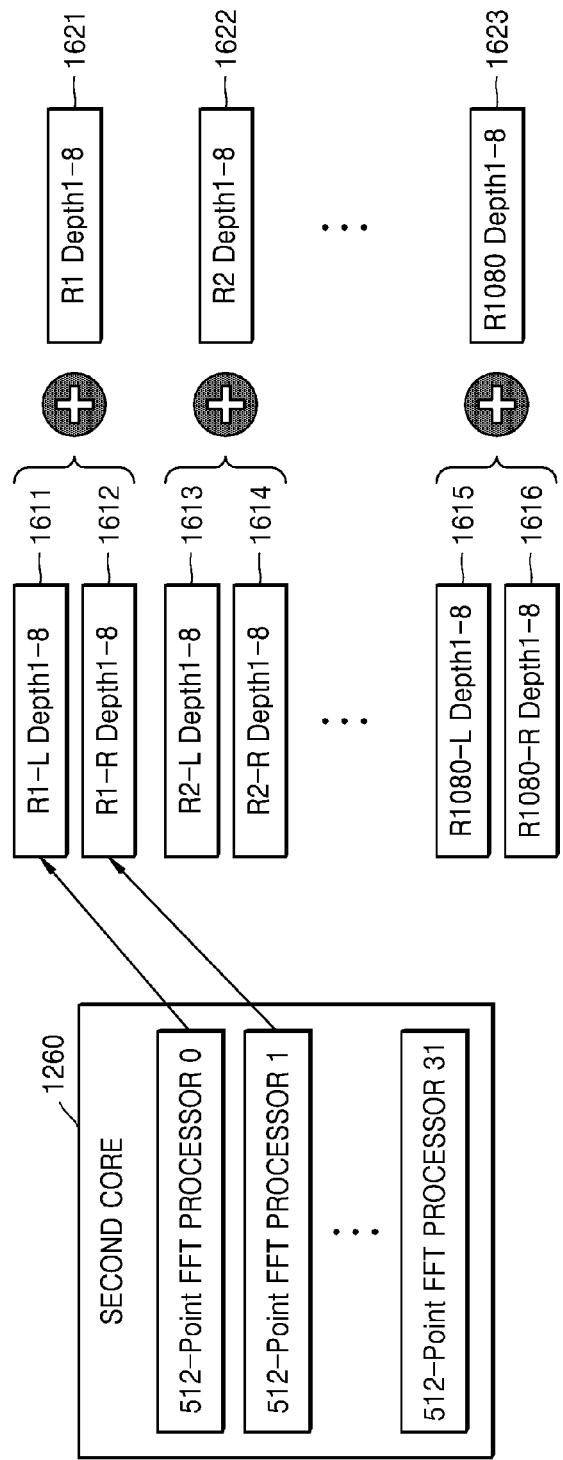
FIG. 16 is a schematic diagram for explaining an addition of a left-eye image and a right-eye image.

FIG. 16 is a schematic diagram for explaining an addition of a left-eye image and a right-eye image. The 3D image processing apparatus 1000 generates a final line by adding secondarily-Fourier-transformed lines 1611 through 1616, that is, by adding left and right lines. For example, the 3D image processing apparatus 1000 generates a line 1621 by adding a left-eye line 1611 to a corresponding right-eye line 1612, generates a line 1622 by adding a left-eye line 1613 to a corresponding right-eye line 1614, and generates a line 1623 by adding a left-eye line 1615 to a corresponding right-eye line 1616.

FIG. 17 is a flowchart of a 3D image processing method, according to an exemplary embodiment.

In operation 1710, the 3D image processing apparatus 1000 acquires a frame by combining a red image, a green image, and a blue image with a depth image. The 3D image processing apparatus 1000 acquires a frame by combining the lines of a color image with the lines of a depth image. The 3D image processing apparatus 1000 may acquire a frame in which the lines of the color image are adjacent to corresponding lines of the depth image. The 3D image processing apparatus 1000 may acquire a frame for each color. In particular, the 3D image processing apparatus 1000 may acquire a frame into which a red image and a corresponding depth image are combined, a frame into which a blue image and a corresponding depth image are combined, and a frame into which a green image and a corresponding depth image are combined.

The 3D image processing apparatus 1000 may capture the color image and the depth image and may generate a frame by combining the color image with the depth image.

In operation 1720, the 3D image processing apparatus 1000 transforms a single line of the color image into a plurality of lines according to depth levels. Accordingly, when the number of lines of the color image is 1080 and the number of depth levels is 10, a total of 1,080×10=10,800 lines are generated.

In operation 1730, the 3D image processing apparatus 1000 performs a primary Fourier transform on the lines. The 3D image processing apparatus 1000 inputs a plurality of transformed lines to processors, respectively, and performs a primary Fourier transform on each of the plurality of input transformed lines. The plurality of lines may be simultaneously processed, e.g., via implementation of a parallel processing operation.

In operation 1740, the 3D image processing apparatus 1000 generates a single added line by adding the transformed lines together. The plurality of primarily-Fourier-transformed lines are added together in order to return to the single line.

In operation 1750, the 3D image processing apparatus 1000 performs a secondary Fourier transform on the added line. The 3D image processing apparatus 1000 generates a final line by adding left-eye and right-eye lines among secondarily-Fourier-transformed lines obtained as a result of the performed secondary Fourier transform.

A new format of a frame may be generated by combining a color image with a depth image.

A frame is processed in units of lines, thereby reducing the number of frames stored in an external memory.

The apparatuses described herein may comprise a processor, a memory for storing program data and executing a program, a permanent storage unit such as a disk drive, a communications port for handling communications with external devices, and user interface devices, including a touch panel, keys, buttons, etc. When software modules or algorithms are involved, these software modules may be stored as program instructions or computer readable codes which are executable by a processor on a transitory or non-transitory computer-readable recording medium. Examples of the computer-readable recording medium include magnetic storage media (e.g., read-only memory (ROM), random-access memory (RAM), floppy disks, hard disks, etc.), and optical recording media (e.g., CD-ROMs, or Digital Versatile Discs (DVDs)). The computer readable recording medium can also be distributed over network coupled computer systems so that the computer readable code is stored and executed in a distributive manner. This media can be read by the computer, stored in the memory, and executed by the processor.

Exemplary embodiments may be described in terms of functional block components and various processing steps. Such functional blocks may be realized by any number of hardware and/or software components which are configured to perform the specified functions. For example, exemplary embodiments may employ various integrated circuit (IC) components, e.g., memory elements, processing elements, logic elements, look-up tables, and the like, which may carry out a variety of functions under the control of one or more microprocessors or other control devices. Similarly, where the elements are implemented by using software programming or software elements, the exemplary embodiments described herein may be implemented with any programming or scripting language such as C, C++, Java, assembler language, or the like, with the various algorithms being implemented with any combination of data structures, objects, processes, routines or other programming elements. Functional aspects may be implemented in algorithms that are executed by one or more processors. Furthermore, the exemplary embodiments described herein could employ any number of conventional techniques for electronics configuration, signal processing and/or control, data processing and the like. The words "mechanism," "element," "means," and "configuration" are used broadly and are not limited to mechanical or physical exemplary embodiments, but can include software routines in conjunction with processors, etc.

The particular implementations shown and described herein are illustrative examples and are not intended to otherwise limit the scope of the present inventive concept in any way. For the sake of brevity, conventional electronics, control systems, software development and other functional aspects of the systems may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical apparatus.

The use of the terms "a" and "an" and "the" and similar referents in the context of describing the exemplary embodiments (especially in the context of the following claims) are to be construed to cover both the singular and the plural. Furthermore, recitation of ranges of values herein are merely intended to serve as a shorthand method of referring individually to each separate value falling within the range, unless otherwise indicated herein, and each separate value is incorporated into the specification as if it were individually recited herein. Also, the steps of all methods described herein can be performed in any suitable order unless otherwise indicated herein or otherwise clearly contradicted by context. The present inventive concept is not limited to the described order of the steps. The use of any and all examples, or exemplary language (e.g., "such as") provided herein, is intended merely to better illuminate the present inventive concept and does not pose a limitation on the scope of the present inventive concept unless otherwise claimed. Numerous modifications and adaptations will be readily apparent to a person having ordinary skill in the art without departing from the spirit and scope of the exemplary embodiments.

What is claimed is:

1. A method for processing a three-dimensional (3D) image, the method comprising:
    acquiring a frame of a color image and a frame of a depth image; and
    generating a frame by combining the acquired frame of the color image with the acquired frame of the depth image,
    wherein the color image comprises a red image comprising a left-eye red image and a right-eye red image, a green image comprising a left-eye green image and a right-eye green image, and a blue image comprising a left-eye blue image and a right-eye blue image,
    wherein the depth image comprises a red depth image comprising a left-eye red depth image and a right-eye red depth image, a green depth image comprising a left-eye green depth image and a right-eye green depth image, and a blue depth image comprising a left-eye blue depth image and a right-eye blue depth image, and
    wherein the generating of the frame comprises:
        sequentially arranging a line of the acquired frame of the left-eye red image combined with a line of the acquired frame of the left-eye red depth image, and a line of the acquired frame of a right-eye red image combined with a line of the acquired frame of the right-eye red depth image,
        sequentially arranging a line of the acquired frame of the left-eye green image combined with a line of the acquired frame of the left-eye green depth image and a line of the acquired frame of a right-eye green image combined with a line of the acquired frame of the right-eye green depth image, and
        sequentially arranging a line of the acquired frame of the left-eye blue image combined with a line of the acquired frame of the left-eye blue depth image and a line of the acquired frame of a right-eye blue image combined with a line of the acquired frame of the right-eye blue depth image.

2. The method of claim 1, wherein the generating of the frame comprises arranging the corresponding line of the acquired frame of the depth image on a next row to a row on which the respective line of the acquired frame of the color image is arranged.

3. The method of claim 1, wherein the generating of the frame comprises generating a frame by combining a frame of a left-eye image of the color image and a frame of a right-eye image of the color image with the acquired frame of the depth image.

4. An apparatus for processing a three-dimensional (3D) image, the apparatus comprising:
    a camera configured to acquire a frame of a color image and a frame of a depth image, the color image comprising a red image, a green image, and a blue image, and the depth image comprising a red depth image, a green depth image, and a blue depth image;
    a memory configured to store the acquired frame of the color image and the acquired frame of the depth image; and
    a processor configured to generate a frame by combining the acquired frame of the color image with the acquired frame of the depth image,
    wherein the processor is configured to combine a line of each of the red image, the green image, and the blue image with a corresponding line of the corresponding one from among the red depth image, the green depth image, and the blue depth image,
    wherein the red image comprises a left-eye red image and a right-eye image, the green image comprises a left-eye green image and a right-eye green image, and the blue image comprises a left-eye blue image and a right-eye blue image, wherein the red depth image comprises a left-eye red depth image and a right-eye red depth image, the green depth image comprises a left-eye green depth image and a right-eye green depth image, and the blue depth image comprises a left-eye blue depth image and a right-eye blue depth image, and wherein the combining comprises combining a respective line of the left-eye red image with a corresponding line of the left-eye red depth image, combining a respective line of the right-eye red image with a corresponding line of the right-eye red depth image, combining a respective line of the left-eye green image with a corresponding line of the left-eye green depth image, combining a respective line of the right-eye green image with a corresponding line of the right-eye green depth image, combining a respective line of the left-eye blue image with a corresponding line of the left-eye blue depth image, and combining a respective line of the right-eye blue image with a corresponding line of the right-eye blue depth image.

5. The apparatus of claim 4, wherein the processor is configured to arrange the line of the acquired frame of each of the red depth image, the green depth image, and the blue depth image on a next row to a row on which the corresponding line of each of the red image, the green image, and the blue image, respectively, are arranged.

6. The apparatus of claim 4, wherein the processor is configured to arrange the line of the acquired frame of each of the red image, the green image, and the blue image and the corresponding line of the acquired frame of each of the red depth image, the green depth image, and the blue depth image, respectively, on a same row.

7. The apparatus of claim 4, wherein the processor is configured to generate a frame by combining a frame of a left-eye image of each of the red image, the green image, and the blue image and a frame of a right-eye image of each of the red image, the green image, and the blue image with the acquired frame of each of the red depth image, the green depth image, and the blue depth image, respectively.

8. The apparatus of claim 7, wherein the processor is configured to sequentially arrange a line of the frame of the left-eye image, a line of the acquired frame of the depth image that corresponds to the line of the frame of the left-eye image, a line of the frame of the right-eye image, and a line of the acquired frame of the depth image that corresponds to the line of the frame of the right-eye image.

9. A method for processing a three-dimensional (3D) image, the method comprising:
acquiring a composite color image and a composite depth image; and generating a frame by combining the composite color image with the composite depth image, wherein the composite color image comprises a red image, a green image, and a blue image, and the composite depth image comprises a red depth image, a green depth image, and a blue depth image, and wherein the generating of the frame comprises combining a respective line of each of the red image, the green image, and the blue image with a corresponding line of the corresponding one from among the red depth image, the green depth image, and the blue depth image, wherein the red image comprises a left-eye red image and a right-eye image, the green image comprises a left-eye green image and a right-eye green image, and the blue image comprises a left-eye blue image and a right-eye blue image, wherein the red depth image comprises a left-eye red depth image and a right-eye red depth image, the green depth image comprises a left-eye green depth image and a right-eye green depth image, and the blue depth image comprises a left-eye blue depth image and a right-eye blue depth image, and wherein the combining comprises combining a respective line of the left-eye red image with a corresponding line of the left-eye red depth image, combining a respective line of the right-eye red image with a corresponding line of the right-eye red depth image, combining a respective line of the left-eye green image with a corresponding line of the left-eye green depth image, combining a respective line of the right-eye green image with a corresponding line of the right-eye green depth image, combining a respective line of the left-eye blue image with a corresponding line of the left-eye blue depth image, and combining a respective line of the right-eye blue image with a corresponding line of the right-eye blue depth image.

10. The method of claim 9, wherein the generating of the frame comprises arranging the corresponding line of each of the red depth image, the green depth image, and the blue depth image on a next row to a row on which the respective line of the corresponding one from among the red image, the green image, and the blue image is arranged.

11. The method of claim 9, wherein the generating of the frame comprises arranging the respective line of each of the red image, the green image, and the blue image and the corresponding line of the corresponding one from among the red depth image, the green depth image, and the blue depth image on a same row.

* * * * *